US009527368B2

(12) United States Patent
Raymond

(10) Patent No.: US 9,527,368 B2
(45) Date of Patent: Dec. 27, 2016

(54) SEMI-INDEPENDENT SUSPENSION SYSTEM FOR A LOW-FLOOR VECHICLE

(71) Applicant: PANTERO TECHNOLOGIES INC., Montreal (CA)

(72) Inventor: Jean Raymond, Montreal (CA)

(73) Assignee: PANTERO TECHNOLOGIES INC., Montreal, QC (CA)

(*) Notice: Subject to any disclaimer, the term of this patent is extended or adjusted under 35 U.S.C. 154(b) by 46 days.

(21) Appl. No.: 14/409,673

(22) PCT Filed: Jun. 11, 2013

(86) PCT No.: PCT/CA2013/000567
§ 371 (c)(1),
(2) Date: Dec. 19, 2014

(87) PCT Pub. No.: WO2014/005215
PCT Pub. Date: Jan. 9, 2014

(65) Prior Publication Data
US 2015/0191070 A1    Jul. 9, 2015

Related U.S. Application Data

(60) Provisional application No. 61/667,567, filed on Jul. 3, 2012.

(51) Int. Cl.
*B60G 21/05*    (2006.01)
*B60G 3/14*    (2006.01)

(52) U.S. Cl.
CPC ............. *B60G 21/052* (2013.01); *B60G 3/14* (2013.01); *B60G 21/051* (2013.01);
(Continued)

(58) Field of Classification Search
CPC ..... B60G 21/05; B60G 21/051; B60G 21/052; B60G 21/053; B60G 3/12; B60G 3/14; B60G 2200/21; B60G 2200/22; B60G 2204/143; B60G 2204/148; B60G 2206/20; B60G 2206/121; B60G 2206/201; B60G 2300/38
See application file for complete search history.

(56) References Cited

U.S. PATENT DOCUMENTS 3,687,479 A * 8/1972 Kober .................. B60G 11/225
267/258
RE28,259 E * 12/1974 Henschen ............ B60G 11/225
267/154
(Continued)

FOREIGN PATENT DOCUMENTS

FR      2761304 A1   10/1998
WO   WO2012090010 A2    7/2012

OTHER PUBLICATIONS

International Search Report, PCT/CA2013/000567, Sep. 5, 2013.

*Primary Examiner* — Barry Gooden, Jr.
(74) *Attorney, Agent, or Firm* — Norton Rose Fulbright Canada LLP

(57) ABSTRACT

A semi-independent suspension system adapted for a rear or front drive and optionally steerable axle system of a low-floor heavy vehicle, comprising a twist beam axle assembly (1), a Panhard rod (8), and a pair of spring and shock absorber systems (9). The twist beam axle assembly (1) comprises a pair of rigid longitudinal trailing arms (3), a pair of wheel mounting members to lower the cross-beam relative to the wheel axis (2) and a straight cross-beam (7). The cross-beam is set in the right and left trailing arms and the wheel mounting members by an interference fit technique. The cross-beam (7) has an open-section and is rigid in bending but flexible in torsion. The shape of the cross-section is specifically tailored to increase and control each of the vertical and horizontal bending stiffness (7). The cross- (Continued)

section is characterized by having horizontal and vertical lines of symmetry, but with asymmetric horizontal and vertical geometries. The combination of features of the twist beam axle assembly (1) provides for a full flat floor without slope or extra height over the axle.

16 Claims, 8 Drawing Sheets

(52) U.S. Cl.
CPC .... *B60G 2200/21* (2013.01); *B60G 2200/341* (2013.01); *B60G 2200/44* (2013.01); *B60G 2204/148* (2013.01); *B60G 2206/014* (2013.01); *B60G 2206/20* (2013.01); *B60G 2206/50* (2013.01); *B60G 2206/82* (2013.01); *B60G 2300/02* (2013.01); *B60G 2300/38* (2013.01)

(56) References Cited

U.S. PATENT DOCUMENTS

| | | | | |
|---|---|---|---|---|
| 4,458,917 A * | 7/1984 | Maru | B60G 9/00 267/183 |
| 4,544,180 A * | 10/1985 | Maru | B60G 9/003 280/124.106 |
| 4,616,849 A * | 10/1986 | Matsumoto | B60G 15/062 280/124.116 |
| 4,723,790 A * | 2/1988 | Wharton | F16F 1/16 267/279 |
| 4,787,680 A * | 11/1988 | Bonjean | B60G 21/051 280/124.116 |
| 4,830,400 A * | 5/1989 | Penot | B60B 35/06 280/124.13 |
| 4,921,231 A * | 5/1990 | Reynolds | B60G 11/185 16/308 |
| 5,083,812 A * | 1/1992 | Wallace | B60G 9/00 280/124.106 |
| 5,163,701 A * | 11/1992 | Cromley, Jr. | B60G 11/185 267/285 |
| 5,326,128 A * | 7/1994 | Cromley, Jr. | B60G 3/145 180/906 |
| 5,409,254 A * | 4/1995 | Minor | B60G 9/003 267/190 |
| 5,741,027 A * | 4/1998 | Stroh | B60B 35/06 180/905 |
| 6,003,888 A * | 12/1999 | Godbersen | B60G 11/225 267/276 |
| 6,086,162 A * | 7/2000 | Pinch | B60G 3/145 228/185 |
| 6,122,948 A * | 9/2000 | Moses | B21D 26/033 29/897.2 |
| 6,375,203 B1 * | 4/2002 | Warinner | B60G 9/003 280/124.128 |
| 6,543,857 B1 * | 4/2003 | Griffiths | B60B 35/08 301/124.1 |
| 6,702,057 B1 * | 3/2004 | Bartel | B60G 11/04 180/292 |
| 7,536,765 B2 * | 5/2009 | Deslande | B21D 26/14 180/905 |
| 8,191,911 B1 * | 6/2012 | Reynolds | B60G 3/20 267/273 |
| 8,573,621 B1 * | 11/2013 | Reynolds | B60G 3/20 267/273 |
| 8,833,779 B1 * | 9/2014 | Vestrand | B60G 21/051 280/124.116 |
| 2004/0070129 A1 * | 4/2004 | Budde | B60G 7/001 267/188 |
| 2004/0232633 A1 * | 11/2004 | Chaput | A63C 17/0046 280/11.28 |
| 2006/0022424 A1 * | 2/2006 | Reynolds | B60G 11/183 280/124.169 |
| 2006/0033298 A1 * | 2/2006 | Longworth | B60G 7/001 280/124.11 |
| 2006/0033303 A1 * | 2/2006 | Shin | B60G 7/008 280/124.128 |
| 2006/0237941 A1 * | 10/2006 | Smith | B60G 3/20 280/124.135 |
| 2006/0244234 A1 * | 11/2006 | Ramsey | B60G 5/047 280/124.131 |
| 2006/0244236 A1 * | 11/2006 | Cortez | B60G 11/113 280/124.175 |
| 2008/0150349 A1 * | 6/2008 | Riffier | B60G 21/051 301/124.1 |
| 2008/0224435 A1 * | 9/2008 | Holt | B60G 7/001 280/124.11 |
| 2010/0038893 A1 * | 2/2010 | Stolle | B21D 26/035 280/781 |
| 2010/0098483 A1 * | 4/2010 | Toepker | B23K 11/14 403/271 |
| 2010/0127469 A1 * | 5/2010 | Quaing | B60G 9/00 280/124.111 |
| 2010/0219677 A1 * | 9/2010 | Borgi | B60G 7/008 301/132 |
| 2010/0276903 A1 * | 11/2010 | Winter | B60G 7/02 280/124.111 |
| 2011/0084461 A1 * | 4/2011 | Bird | B60G 21/045 280/124.128 |
| 2011/0109052 A1 * | 5/2011 | Hatzikakidis | B60G 3/12 280/5.5 |
| 2011/0227402 A1 * | 9/2011 | Wibbeke | B60G 7/001 301/124.1 |
| 2012/0001397 A1 * | 1/2012 | McLaughlin | B23K 20/12 280/124.1 |
| 2012/0056469 A1 * | 3/2012 | Bubulka | B60B 35/003 301/127 |
| 2012/0142487 A1 * | 6/2012 | Winter | B60K 1/00 475/332 |
| 2012/0292874 A1 * | 11/2012 | Davy | B60G 3/207 280/124.111 |
| 2013/0300188 A1 * | 11/2013 | Dhont | B60G 21/051 301/124.1 |
| 2014/0000970 A1 * | 1/2014 | Munster | B60K 7/0007 180/55 |
| 2014/0014425 A1 * | 1/2014 | Yamanaka | B60G 21/051 180/65.51 |
| 2014/0138930 A1 * | 5/2014 | Beck | B60G 11/225 280/124.131 |
| 2014/0151973 A1 * | 6/2014 | Baumer | B60G 11/189 280/124.128 |
| 2014/0225351 A1 * | 8/2014 | VanDenberg | B60G 11/18 280/684 |
| 2014/0361474 A1 * | 12/2014 | Hatzikakidis | B60G 15/06 267/140.14 |
| 2014/0375011 A1 * | 12/2014 | Lee | B60G 7/001 280/124.13 |
| 2015/0014956 A1 * | 1/2015 | Roland | B60G 21/051 280/124.128 |
| 2015/0130262 A1 * | 5/2015 | Fuks | B21K 1/12 301/124.1 |
| 2015/0191070 A1 * | 7/2015 | Raymond | B60G 3/14 280/124.128 |

* cited by examiner

SEMI-INDEPENDENT SUSPENSION SYSTEM FOR A LOW-FLOOR VECHICLE

TECHNICAL FIELD

The present invention generally relates to an automotive suspension system and, more particularly, to a semi-independent suspension system for drive and/or steerable wheels. The present invention also refers to a low-floor motor vehicle having a semi-independent suspension system.

BACKGROUND

Low-floor commercial vehicles, such as city buses, have rear axles supporting and driving the vehicle. As largely described in prior art, such axles are typically offset axles or inverted portal axles in order to provide a vehicle with a low floor. An inverted portal axle is a rigid axle having a gear box at each longitudinal end and where the axle shafts are offset vertically relative to the wheel axis. In such axles, the typical centered differential is reduced in size and moved on one side. However, the combined weight of the axle housing, the live axle, the differential and a part of the drive shaft contribute to an undesirably high unsprung weight. Moreover, the torsional stiffness of the tubular nature of these axles limits the suspension linkages to an arrangement which reduces the available space in the aisle between wheel wells.

Alternatively, bowed dead axles such as deDion type suspension systems provide the desired torsional flexibility and also provide the advantage of slightly lowering the floor of the vehicle's body by using a body-mounted differential. However, such systems have not been used on heavy vehicles, such as buses and trucks, because of the sever torsion stresses when resisting vertical displacement of the drive wheels. Eliminating such torsional deflection by increasing the size and the weight of the bowed dead axle is both cost and design prohibitive. Another issue with the deDion type suspension is the prominence of the central differential which is not addressed.

U.S. Pat. No. 5,188,195 introduced a concept of a straight dead axle eliminating the torsional stress by introducing conical bearings supporting the dead axle. If this concept addresses some issues of deDion type suspension systems for heavy duty vehicles, it still makes use of a prominent centered body-mounted differential.

Twist beam axles are also known from the art and typically used on the rear wheels of front-wheel drive cars and particularly of small cars. The twist beam axle typically includes a transversal beam that extends between two trailing arms. The right and left trailing arms are pivotally supported on the vehicle body at their front ends. The transversal beam is generally U-shaped, V-shaped or H-shaped in cross-section, or constructed from hollow pipe with closed and deformed section, and may include a stabilizer bar to tune the torsional stiffness. For a rear-wheel drive vehicle, such a configuration is generally a problem in that the twist beam interferes with others members such as a drive shaft. To overcome this problem, some variations include a bent portion in the beam to make room for the drive shaft; however this affects bending stiffness. The rear drive axle of a heavy commercial vehicle significantly increases the challenge. Higher bending strength and stiffness (vertically and horizontally) are required without sacrificing flexibility in torsion. To increase bending strength and stiffness, the area moment of inertia of the beam cross-sectional area has to be increased. However, when doing so, the beam needs to be increased in length to keep its flexibility in torsion. On typical heavy trucks and city buses, the rear axle comprises a pair of double tires which significantly reduce the available space between wheels limiting the torsion capability of a twist beam.

Twist beam axles are however desirable for rear and front axles of heavy vehicles such as city buses since it may contribute to minimize torsion stresses on the vehicle body, and they are cost effective and durable.

SUMMARY

According to a general aspect, there is provided a suspension system having a drop beam axle for joining wheels of a vehicle, the drop beam axle including none of the driving gears and being a twist beam axle.

In accordance with a general aspect, the suspension system is semi-independent since a rigid beam axle creates a link between the two wheel support assemblies, but this axle is also a twist beam axle which acts as a torsional spring between the wheel support assemblies. More specifically, there is provided a twist beam axle suspension system adapted for a rear or front drive and optionally steerable axle system of a low-floor heavy vehicle.

In accordance with another general aspect, there is provided a rear suspension system for a low-floor vehicle, the vehicle having a chassis frame, spaced apart right and left wheels defining a wheel axis; the rear suspension system comprising: a twist beam axle assembly, a Panhard rod, and a pair of spring and shock absorber systems, said twist beam axle assembly forming a drop beam axle comprising right and left rigid longitudinal trailing arms, right and left wheel mounting members and a straight cross-beam, each of said right and left wheel mounting members forming a vertical member to lower said cross-beam relative to the wheel axis, said wheel mounting members being shaped on their upper portion to be mounted to a wheel support assembly and having on their lower portion an axle locating portion, said axle locating portion shaped for matingly receiving a corresponding end portion of said cross-beam, said right and left trailing arms having at one end an axle locating portion shaped for matingly receiving the corresponding end portion of said cross-beam, said cross-beam having an open cross-section and being rigid in bending but flexible in torsion, the open cross-section of said cross-beam having horizontal and vertical lines of symmetry, but asymmetric horizontal and vertical geometries, wherein said cross-beam is set in the axle locating portions of said right and left trailing arms and wheel mounting members with an interference fit, wherein said right and left trailing arms are adapted to be joined to the chassis frame of the vehicle, each of said right and left trailing arms also comprising a mounting base for attachment to an associated one of said spring and shock absorber systems, said spring and shock absorber systems being adapted to be joined to the chassis frame of the vehicle, and wherein said Panhard rod is adapted to be joined at one end thereof to the chassis frame of the vehicle and at another end thereof to one of the right and left wheel mounting members.

In accordance with a further general aspect, there is provided a front suspension system for a low-floor vehicle, the vehicle having a chassis frame, spaced apart right and left wheels defining a wheel axis, and a steering system; the front suspension system comprising: a twist beam axle assembly, a Panhard rod, and a pair of spring and shock absorber systems, said twist beam axle assembly forming a drop beam axle comprising right and left rigid longitudinal leading arms, right and left wheel mounting members and a straight cross-beam, each of said right and left wheel mounting members forming a vertical member to lower said cross-beam relative to the wheel axis, said wheel mounting members being shaped on their upper portion to be mounted to a steering knuckle by a split king pin and having on their lower portion an axle locating portion, said axle locating portion for matingly receiving an end portion of said cross-beam, said right and left leading arms having at one end an axle locating portion for matingly receiving the end portion of said cross-beam, said cross-beam having an open cross-section and being rigid in bending but flexible in torsion, the open cross-section of said cross-beam having horizontal and vertical lines of symmetry, but asymmetric horizontal and vertical geometries, said wherein the cross-beam is set in the axle locating portions of said right and left leading arms and wheel mounting members with an interference fit, said right and left leading arms being adapted to be joined to the chassis frame of the vehicle, each of said leading arms also comprising a mounting base for attachment to a associated one of said spring and shock absorber systems, wherein said spring and shock absorber systems are adapted to be joined to the chassis frame of the vehicle, and wherein said Panhard rod are adapted to be joined at one end thereof to the chassis frame of the vehicle and at another end thereof to one of the right and left wheel mounting members.

In accordance with a still further general aspect, there is provided a twist beam axle assembly suited for use as a drop beam axle, comprising a straight cross-beam, right and left rigid longitudinal arms mounted at opposed ends of the cross-beam, and right and left wheel mounting members also mounted at said opposed ends of the cross-beam, each of said right and left wheel mounting members having a vertical member extending upwardly relative to the cross-beam, said wheel mounting members being shaped on their upper portion to be mounted to a wheel support assembly and having on their lower portion an axle locating portion, said axle locating portion matingly receiving a corresponding end portion of said cross-beam, said right and left arms having at one end an axle locating portion matingly receiving the corresponding end portion of said cross-beam, said cross-beam having an open cross-section and being rigid in bending but flexible in torsion, the open cross-section of said cross-beam having horizontal and vertical lines of symmetry, but asymmetric horizontal and vertical geometries, wherein said cross-beam is set in the axle locating portions of said right and left arms and wheel mounting members with an interference fit, wherein said right and left arms are adapted to be joined to the chassis frame of the vehicle.

DESCRIPTION OF THE DRAWINGS

The accompanying drawings illustrate possible embodiments of the present invention.

DESCRIPTION

Figure 1:
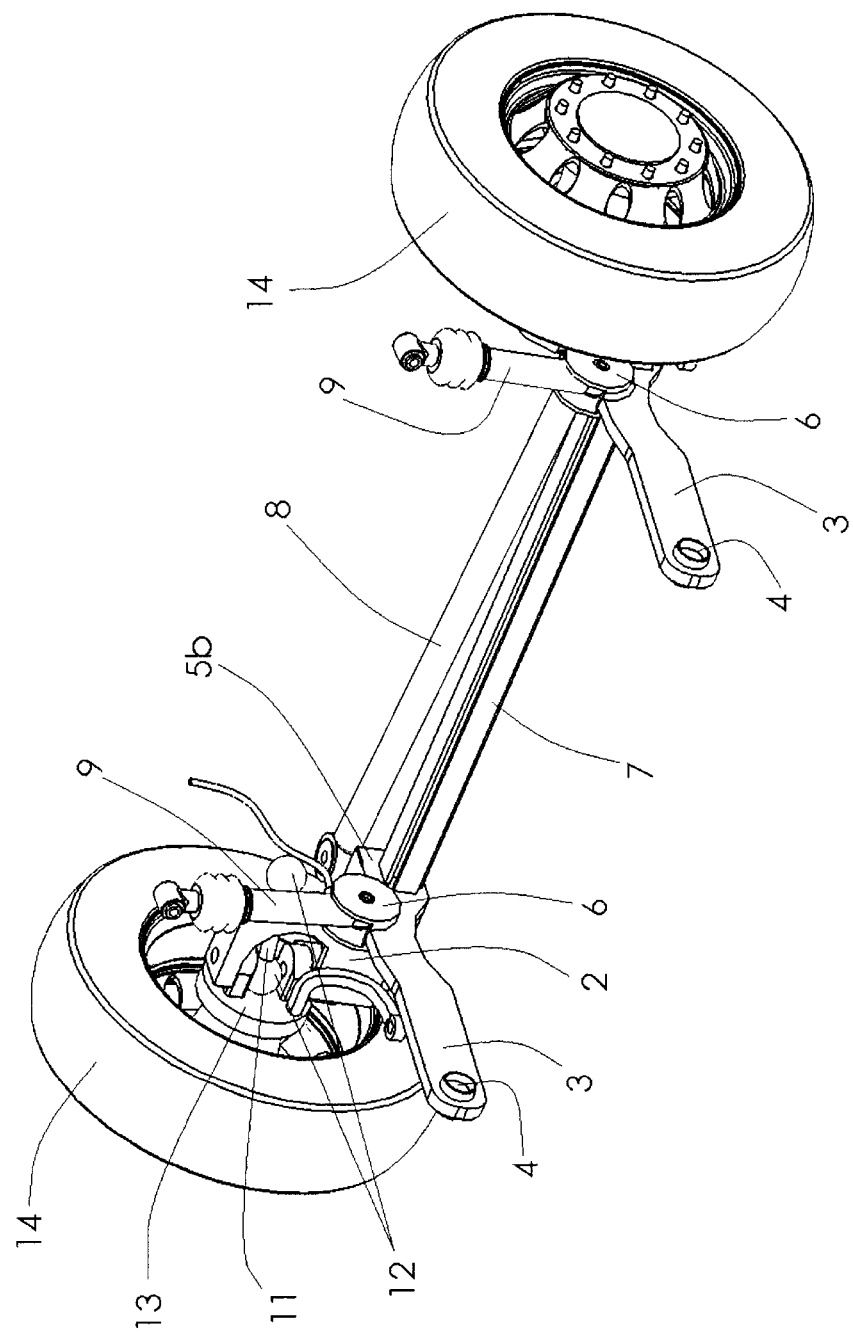
FIG. 1 is a perspective view of the suspension system in accordance with one embodiment of the present invention.
Figure 2:
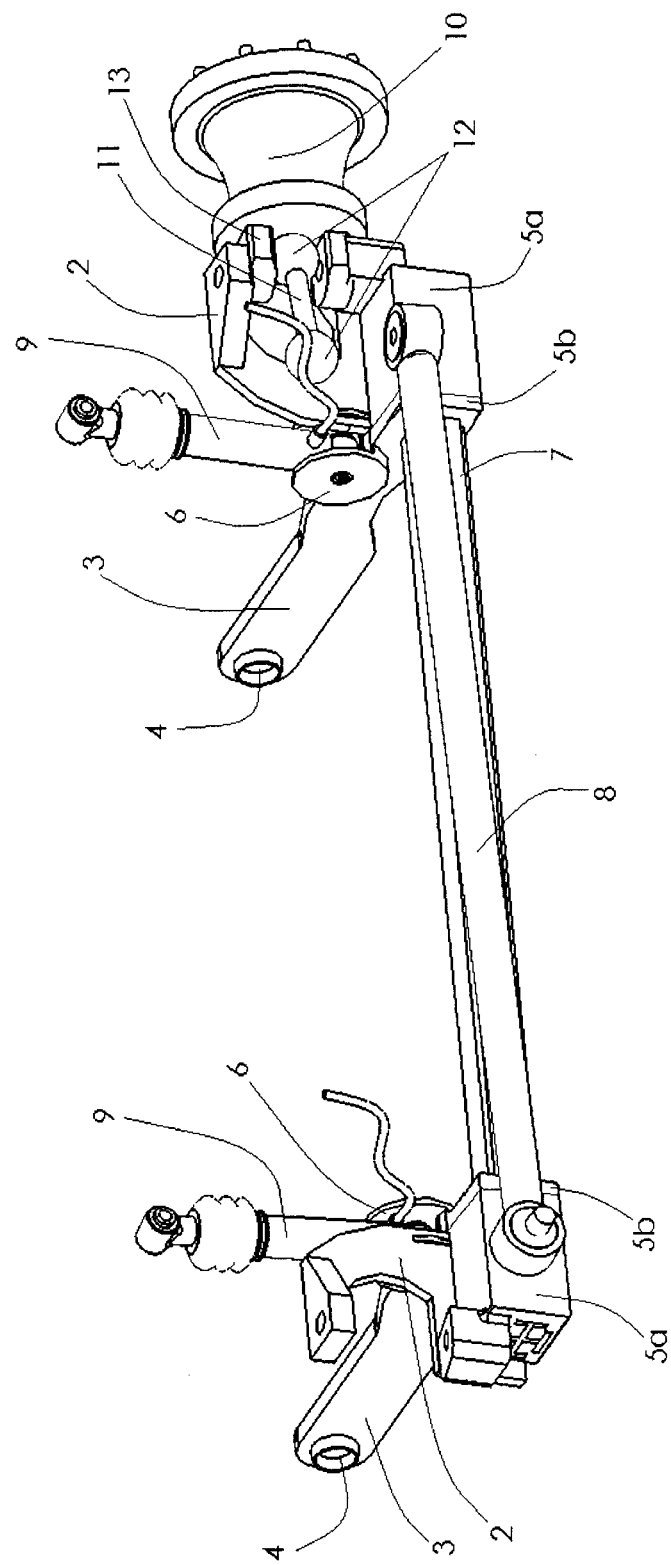
FIG. 2 is a simplified rear view of the suspension system shown in FIG. 1.

FIGS. 1 and 2 illustrate an embodiment of the suspension system having a plurality of component parts described hereinafter, namely a twist beam axle assembly (1), a Panhard rod (8), and a pair of spring and shock absorber systems (9).

The suspension system is designed to take advantage of axles with single tires, in order to minimize space taken by wheel wells of a flat low-floor vehicle and to provide steering capability to a rear axle when coupled to a proper steering system. For heavier vehicles, the system may comprise a tandem of such axles with single tires.

In the following description, the term "chassis frame" should be interpreted in a generic sense and should not be given a restrictive meaning. In this context, a chassis frame may mean a frame, an integral unibody, or any structure of a chassis such as a subframe.

The twist beam axle assembly (1) of the suspension system comprises a pair of rigid longitudinal trailing arms (3) (right and left), a pair of wheel mounting members (2) (right and left) and a straight cross-beam (7). Each one may be made of a distinct material according to cost, performance and manufacturability criteria.

Figure 3A:
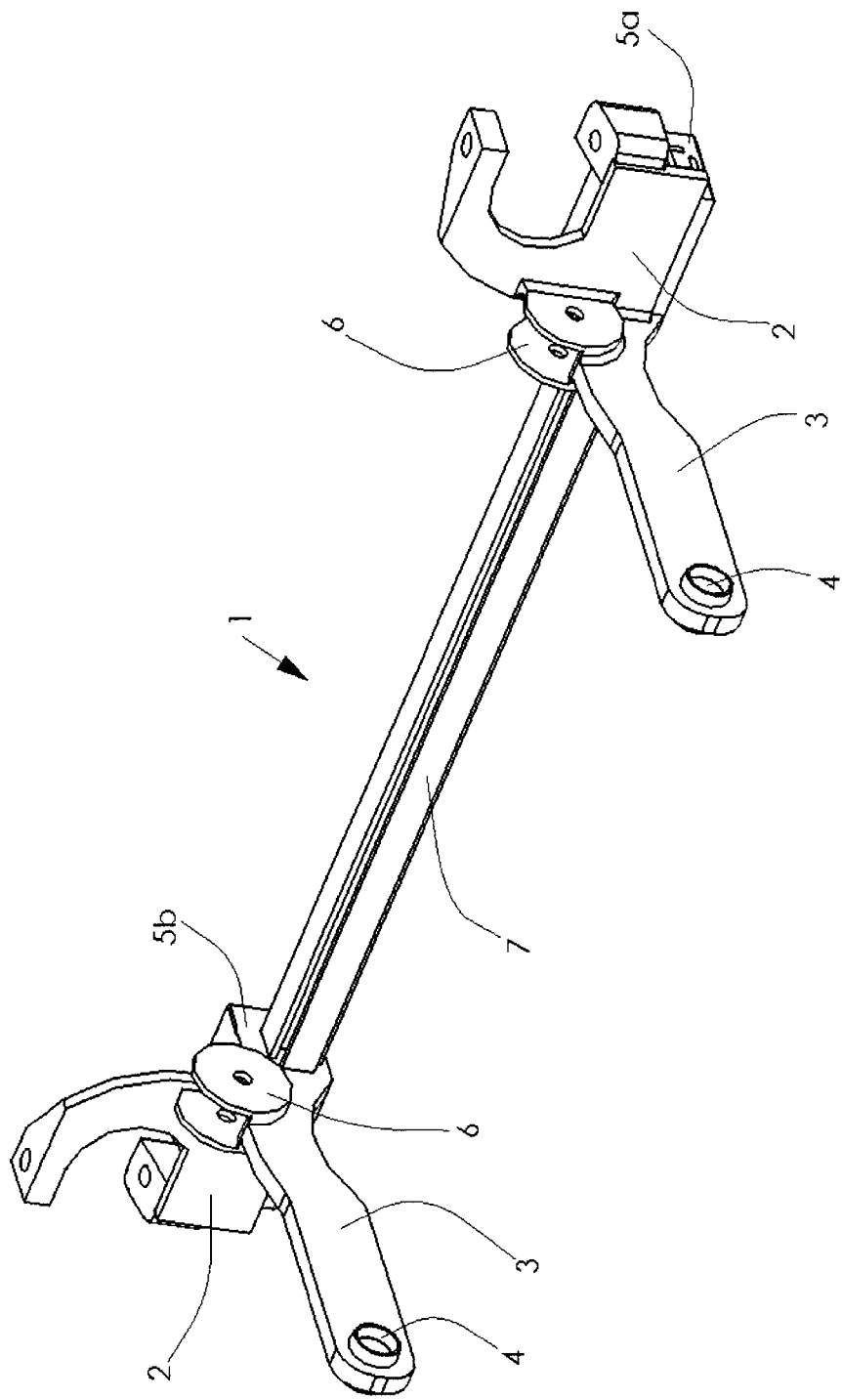
FIG. 3a is a perspective view of the twist beam axle assembly of the suspension system, as shown in FIG. 1, wherein the wheel mounting member is shaped to be attached to a steering knuckle.
Figure 3B:
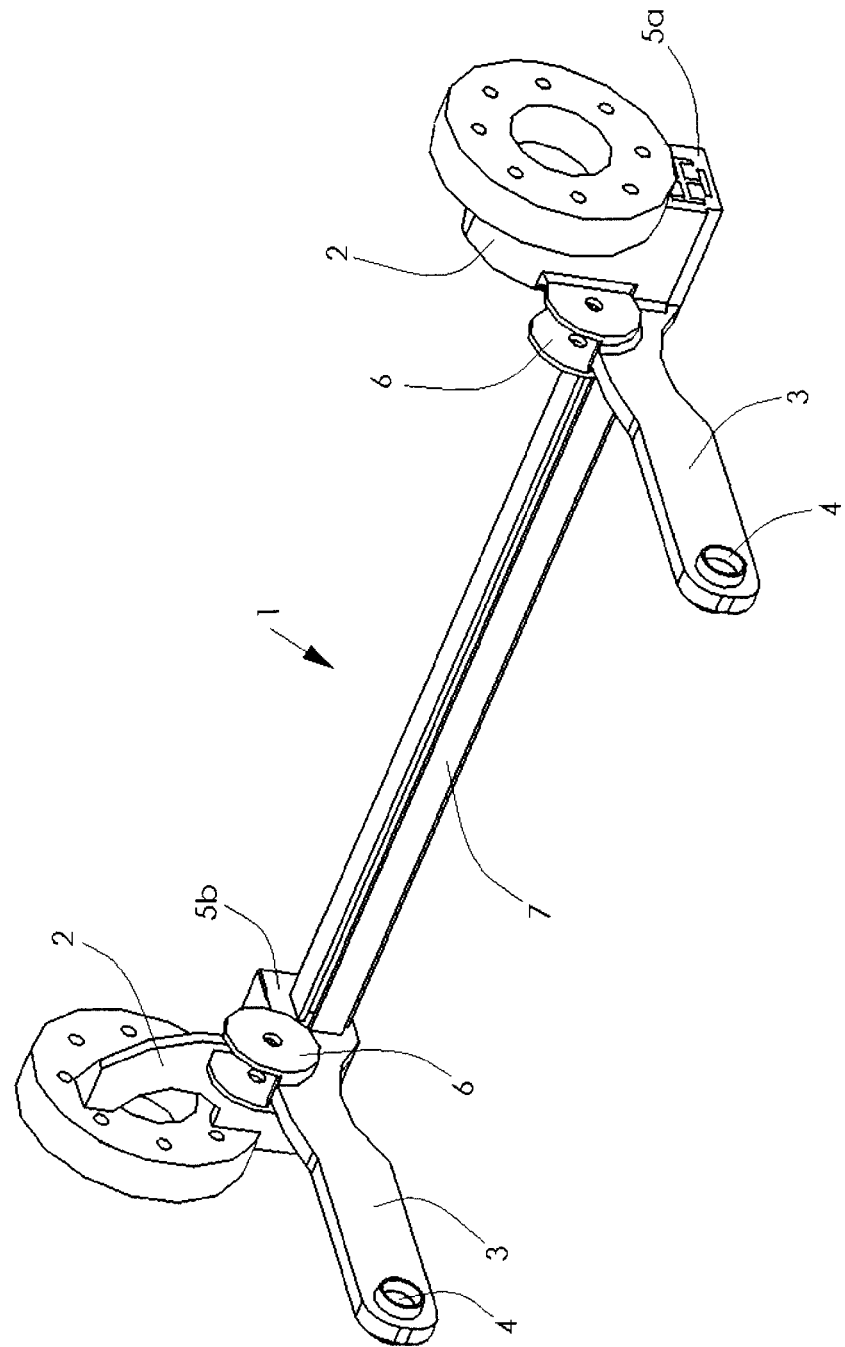
FIG. 3b is a perspective view of the twist beam axle assembly of the suspension system similar to FIG. 3a, wherein the wheel mounting member is shaped to be bolted to a wheel hub assembly.

As described hereinafter, the twist beam axle assembly (1) is suited for forming a drop beam axle for a low-floor vehicle. Each of the wheel mounting members (2) is forming a vertically oriented member to lower the cross-beam (7) relative to the wheel axis as described hereinafter and is shaped on its upper portion to be mounted to a wheel support assembly by conventional means. In one embodiment illustrated in FIG. 3a and compatible with a steerable drive axle, the upper portion of the wheel mounting member (2) is shaped to be attached to a steering knuckle (13) by a split king pin as known by the art. In another embodiment illustrated in FIG. 3b and compatible with a non steerable drive axle, the upper portion is shaped like a ring with circumferentially disposed bores to be connected to a wheel hub assembly. Both embodiments leave room for a drive half-shaft (11) from a body-mounted transaxle (not shown) to be connected to a wheel hub and spindle assembly (10) as shown in FIGS. 1 and 2. Those skilled in the art will understand that different shapes for the wheel mounting members (2) may be used, as required by the specific vehicle configuration, besides the illustrated shapes and within the scope of the present invention. On their lower portion, each of the wheel mounting members (2) has an axle locating portion (5a) in the form of an orifice shaped accordingly to the cross-sectional profile of the cross-beam (7). The orifice is made with a small vertical angle to correct the wheel camber angle when the cross-beam is under load.

As known by those skilled in the art, the trailing arms typically provide a bending stiffness to control axle windup and longitudinal stiffness to control axle position. Each of the right and left trailing arms (3) is joined at one end to the chassis frame of the vehicle, bolted on elastomeric bushings pressed in a biconical bore (4) of the arm. At the other end, each trailing arm (3) has an axle locating portion (5b) in the form of an orifice shaped accordingly to the cross-sectional profile of the cross-beam (7) similar to the one of its corresponding wheel mounting member (2). Each trailing arm (3) is generally joined by a proper mean to its corresponding wheel mounting member (2) in a manner to align their orifices in a uniform and continuous passage for the cross-beam (7). Each trailing arm (3) also comprises a mounting base (6) with mounting bores and elastomeric bushings to attach the spring and shock absorber system (9). In one preferred embodiment, the mounting base (6) is integral to the trailing arm (3).

The straight cross-beam (7) is set in right and left axle locating portions (5a, 5b) by an interference fit technique to minimize stress concentration at critical points of the cross-beam. The assembly may be secured by a proper joining technique (such welding when applicable) at each extremities of the cross-beam (7) on the outer side of the wheel mounting member (2) orifice.

The cross-beam (7) has an open-section, rigid in bending but flexible in torsion, allowing the beam to act as a twist-beam. The straight cross-beam (7) presents the advantage of being easy to cut in various lengths to accommodate various vehicle specifications without change in manufacturing tooling.

Figure 4:
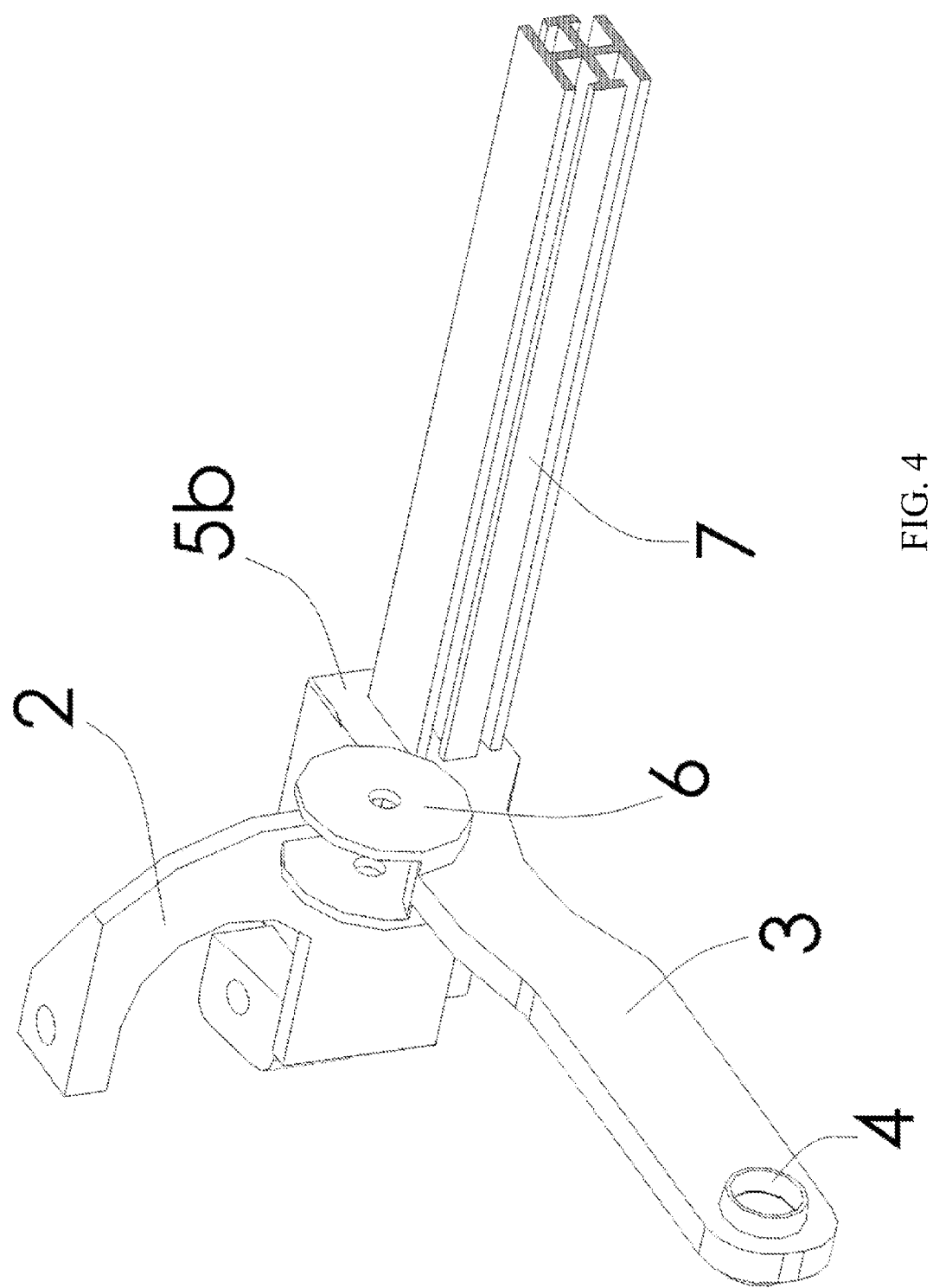
FIG. 4 is a cross-section view of the twist beam axle shown in FIG. 3a in accordance with one preferred embodiment wherein the cross-beam has a section in the shape of an asymmetric cross potent (a cross with a bar at each extremity)
Figure 5A:
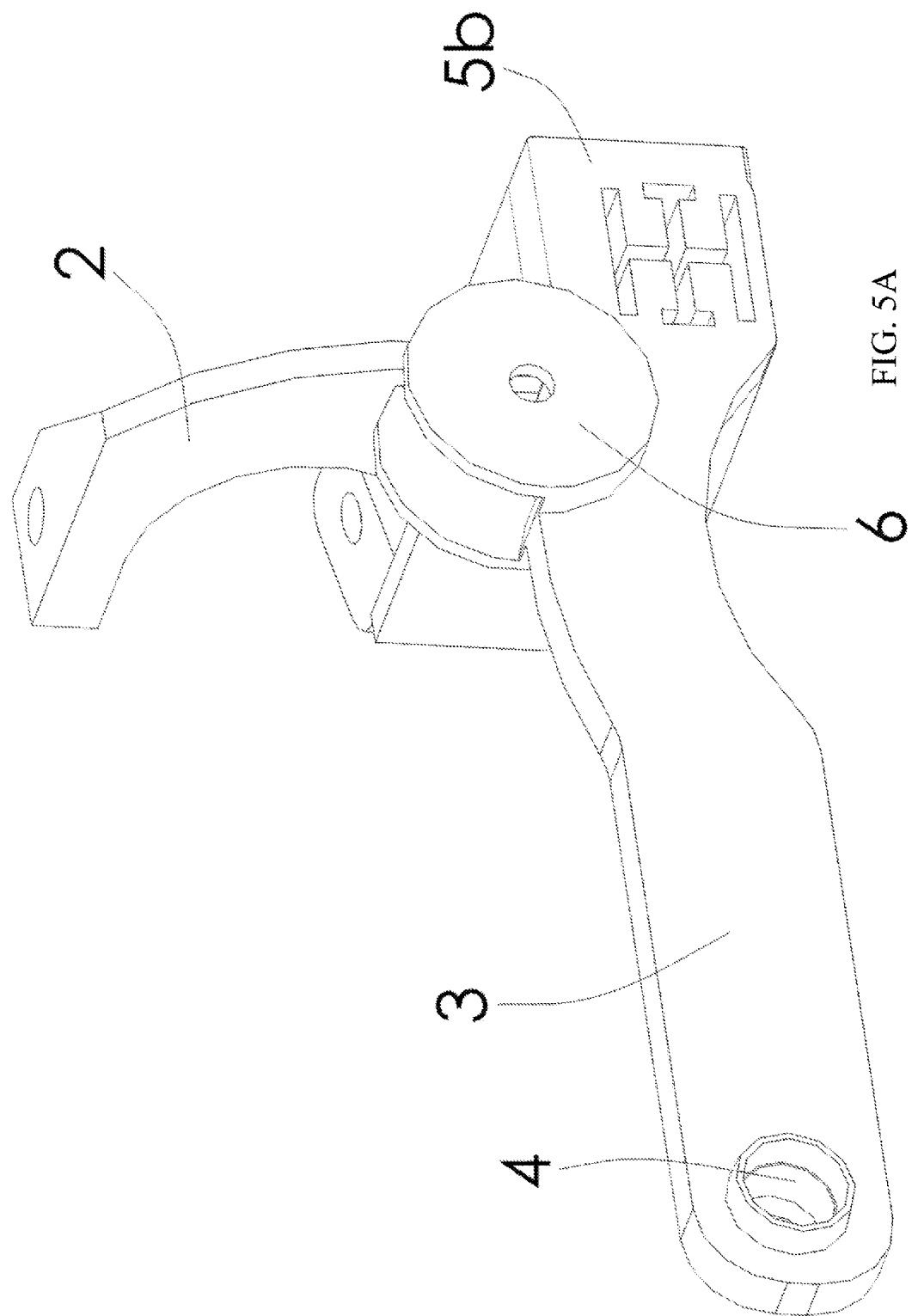
FIGS. 5a and 5b are perspective views showing the orifice in the shape of an asymmetric cross potent in the axle location portion of the trailing/leading arm and of the wheel mounting member.
Figure 5B:
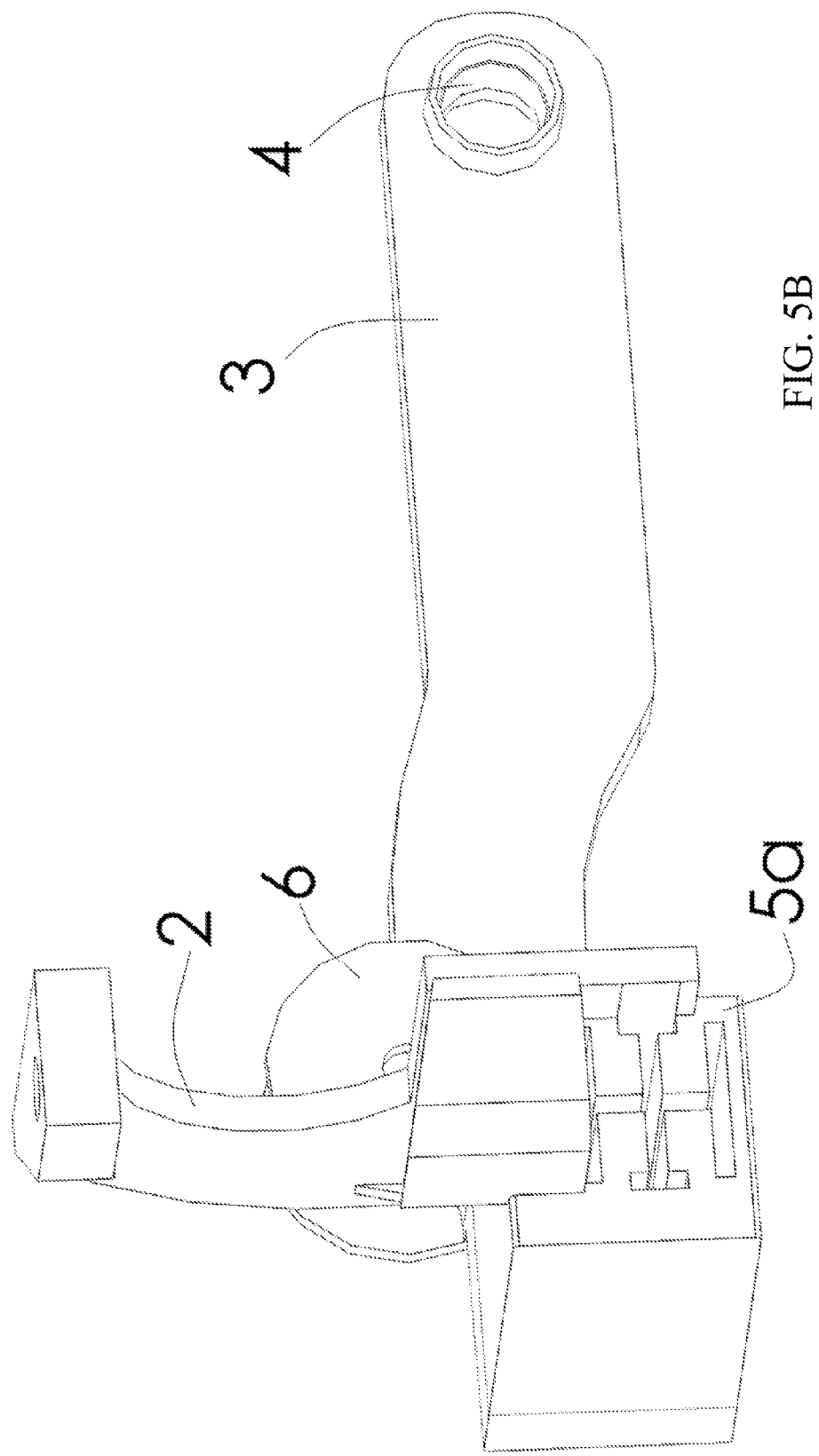
Figure 6:
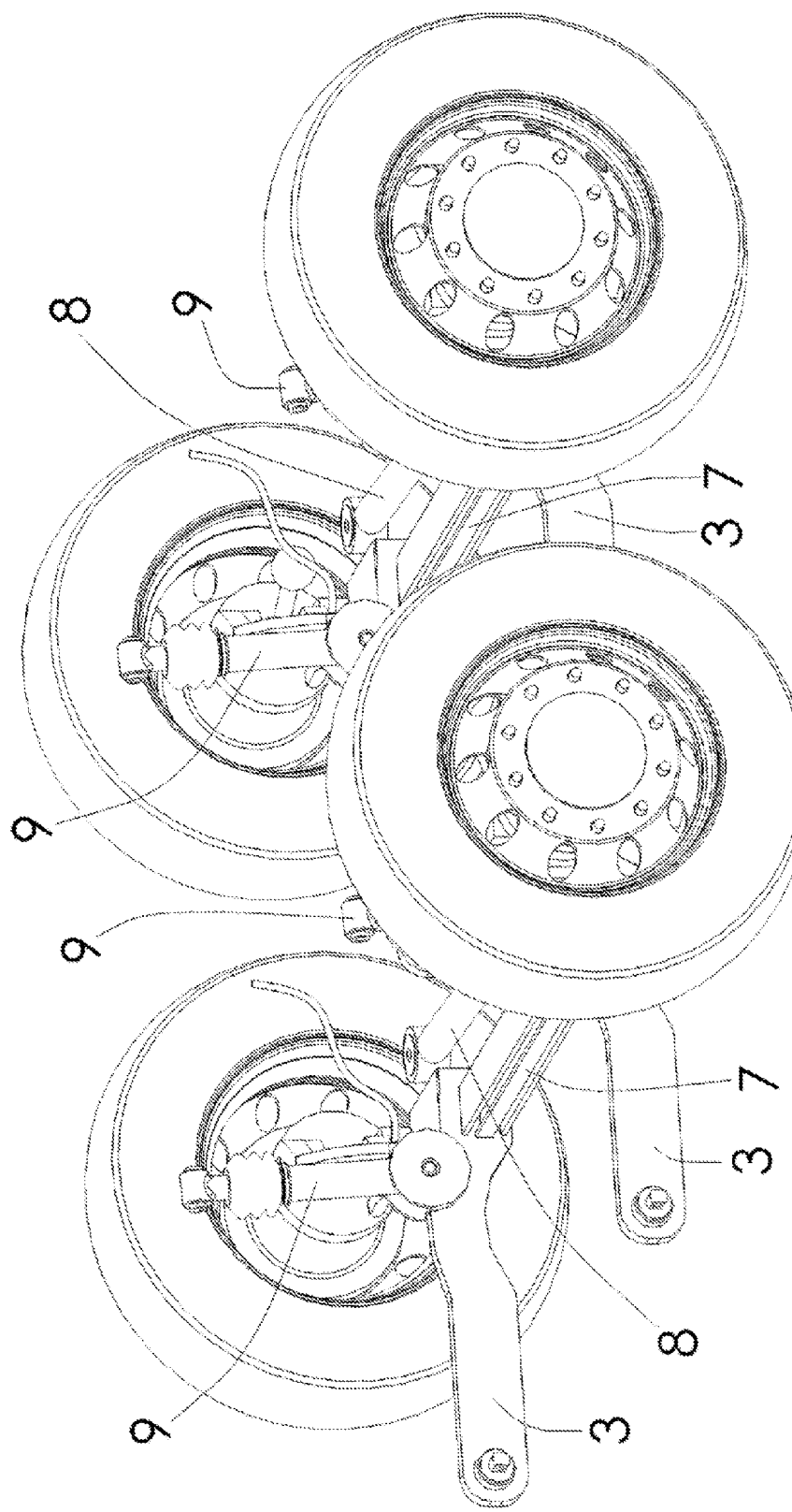
FIG. 6 is a perspective view of a tandem of axles comprising two axle units with single tires.

The shape of the cross-section is specifically tailored to increase and control each of the vertical and horizontal bending stiffness of the cross-beam (7). The cross-section is characterized by having horizontal and vertical lines of symmetry, but with asymmetric horizontal and vertical geometries. In one preferred embodiment, the cross-beam (7) cross-section as an asymmetric cross potent shape as illustrated in FIG. 4. In one preferred embodiment, the axle locating portion (5a, 5b) of the trailing arms and wheel mounting members is an orifice in the negative shape of the open cross-section of the cross-beam (7).

As aforementioned, the cross-beam (7) is made of a specific material determined by cost, performance and manufacturability criteria of the specific application. If steel or light metals such as aluminum or magnesium and their alloys are possible options, in one preferred embodiment the cross-beam (7) is made of carbon-fiber-reinforced polymer and in another preferred embodiment, the said cross-beam (7) is made of a metal matrix composite such as silicon-carbide particle-reinforced aluminum.

As clearly shown by the drawings, the axis formed by the straight cross-beam (7) is offset vertically toward the ground relative to the wheel axis. Since the axle is not a live axle, there is no side reduction gear system limiting the so-called axle drop as seen with conventional inverted portal axles. Moreover, the diameter of the cross-beam (7) is much smaller than typical axle housing of such inverted portal axles also contributing to lowering even more the floor while also improving the ground clearance. The combination of features of the twist beam axle assembly (1) provides a full flat floor without slope or extra height over the axle.

As shown in FIGS. 1 and 2, the suspension system also comprises a Panhard rod (8) provided with elastomeric bushings, mounted at one end of a wheel mounting member (2) and at its other end to the chassis frame, and used to stabilize the axle laterally. A spring and shock absorber system (9) is mounted on each of the trailing arm specific mounting base (6) to complete the connection of the axle to the chassis frame. For heavy commercial vehicles, it is beneficial to control the roll stiffness according to vehicle load. If the twist beam axle assembly (1) slightly contributes the function of an anti-roll bar, this function is largely delegated to the spring and shock absorber system (9) which is characterized by comprising an active roll control system as known from the art. In one preferred embodiment, the spring and shock absorber system is provided in the form of a compact hydraulic spring, concentric with the shock absorber or combining both functions. Since the suspension system takes advantage of axles with single tires, an increased distance between each spring and shock absorber systems (9) reduces the bending effort on the cross-beam (7).

The suspension system is designed to be completed by a transaxle mounted on the chassis frame to transmit the motive power to rear wheels (14), which transaxle (not shown) is connected to the wheel hub and spindle assemblies (10) by two short drive half-shafts (11) with constant velocity joints (12). In order to fully benefit from all its advantages, it is contemplated to use the suspension system with a transaxle driven by electric motors.

The suspension system may be used as a drive and optionally steerable rear axle for heavy duty electric drive buses or trucks with flat low-floor. It is also contemplated to use the suspension system in a tandem of rear axles, where at least one of the axles is a drive axle and at least one is a steerable axle, for heavy duty electric drive buses or trucks with flat low-floor.

In another application, it is also contemplated to use the suspension system for drive and steerable rear axles of each unit of an articulated or multi-articulated electric city bus with single-track or near single-track capability with the proper control system.

According to another application, the trailing arms may be replaced by leading arms and the suspension system may be used as a steerable and optionally drive front axle for heavy duty commercial vehicles with low floor. Since leading arms and trailing arms essentially refer to the relative position of the beam axle, all the aforementioned description of the suspension system may be interpreted as also valid for a front axle by replacing the term trailing arm by leading arm. It is contemplated to use the suspension system for both front and rear axles of a low-floor city bus.

The suspension system combines the advantages of a dead axle such as deDion type suspension systems and those of an inverted portal axle while mitigating the disadvantages of the two systems.

As can be appreciated from the above description, the semi-independent suspension system may be designed to reduce the vehicle's unsprung weight, to substantially reduce the ground-to-floor distance of the body, to provide a wider aisle between wheel wells and to provide a strong, simple and inexpensive dead axle capable of torsional displacement. The suspension system contributes to free-up space to optimize an integral flat low floor of an electric heavy vehicle. The suspension system also reduces part count, mounting points and assembly complexity, while reducing failure modes and improving product integrity, and is cost effective at low volume of production.

The invention claimed is:

1. A twist beam axle assembly suited for use as a drop beam axle, comprising a straight cross-beam, right and left rigid longitudinal arms mounted at opposed ends of the cross-beam, and right and left wheel mounting members also mounted at said opposed ends of the cross-beam, each of said right and left wheel mounting members having a vertical member extending upwardly relative to the cross-beam, said wheel mounting members being shaped on upper portions thereof to be mounted to a wheel support assembly and having on lower portions thereof an axle locating portion, said axle locating portion matingly receiving a corresponding end portion of said cross-beam, said right and left arms having at one end an axle locating portion matingly receiving the corresponding end portion of said cross-beam, said cross-beam having an open cross-section and being rigid in bending but flexible in torsion, the open cross-section of said cross-beam having horizontal and vertical lines of symmetry, but asymmetric horizontal and vertical geometries, wherein said cross-beam is set in the axle locating portions of said right and left arms and said wheel mounting members with an interference fit, wherein said right and left arms are adapted to be joined to the chassis frame of the vehicle, wherein said cross-beam has a section in a shape of an asymmetric cross potent.

2. The twist beam axle assembly defined in claim 1, wherein each of said right and left arms also comprises a mounting base for attachment to a spring and shock absorber system.

3. A rear suspension system for a low-floor vehicle, the vehicle having a chassis frame, spaced apart right and left wheels defining a wheel axis; the rear suspension system comprising: a twist beam axle assembly, a Panhard rod, and a pair of spring and shock absorber systems, said twist beam axle assembly forming a drop beam axle comprising right and left rigid longitudinal trailing arms, right and left wheel mounting members and a straight cross-beam, each of said right and left wheel mounting members forming a vertical member to lower said cross-beam relative to the wheel axis, said wheel mounting members being shaped on upper portions thereof to be mounted to a wheel support assembly and having on lower portions thereof an axle locating portion, said axle locating portion shaped for matingly receiving a corresponding end portion of said cross-beam, said right and left trailing arms having at one end an axle locating portion shaped for matingly receiving the corresponding end portion of said cross-beam, said cross-beam having an open cross-section and being rigid in bending but flexible in torsion, the open cross-section of said cross-beam having horizontal and vertical lines of symmetry, but asymmetric horizontal and vertical geometries, wherein said cross-beam is set in the axle locating portions of said right and left trailing arms and wheel mounting members with an interference fit, wherein said right and left trailing arms are adapted to be joined to the chassis frame of the vehicle, each of said right and left trailing arms also comprising a mounting base for attachment to an associated one of said spring and shock absorber systems, said spring and shock absorber systems being adapted to be joined to the chassis frame of the vehicle, and wherein said Panhard rod is adapted to be joined at one end thereof to the chassis frame of the vehicle and at another end thereof to one of the right and left wheel mounting members, wherein said cross-beam has a section in a shape of an asymmetric cross potent.

4. A rear suspension system, according to claim 3, wherein each of said axle locating portions of said right and left wheel mounting members and said trailing arms has an orifice in a negative shape of the open cross-section of said cross-beam.

5. A rear suspension system according to claim 3, wherein each of said right and left wheel mounting members has a ring shape with circumferentially disposed bores to be connected to a wheel hub assembly.

6. A rear suspension system according to claim 3, wherein each of said right and left wheel mounting members is shaped to be attached to a steering knuckle by a split king pin.

7. A rear-wheel axle unit with single tires comprising a rear suspension system according to claim 6, wherein the right and left wheels are steerable.

8. A rear-wheel axle unit according to claim 7, wherein the right and left wheels are driven by two short drive half-shafts with constant velocity joints and connected to right and left wheel hub and spindle assemblies.

9. A rear-wheel axle unit with single tires comprising a rear suspension system according to claim 3, wherein the right and left wheels are driven by two short drive half-shafts with constant velocity joints and connected to right and left wheel hub and spindle assemblies.

10. A tandem of rear axles comprising two rear-wheel axle units with single tires according to claim 9.

11. A low-floor vehicle comprising at least one axle unit according to claim 9.

12. A front suspension system for a low-floor vehicle, the vehicle having a chassis frame, spaced apart right and left wheels defining a wheel axis, and a steering system; the front suspension system comprising: a twist beam axle assembly, a Panhard rod, and a pair of spring and shock absorber systems, said twist beam axle assembly forming a drop beam axle comprising right and left rigid longitudinal leading arms, right and left wheel mounting members and a straight cross-beam, each of said right and left wheel mounting members forming a vertical member to lower said cross-beam relative to the wheel axis, said wheel mounting members being shaped on upper portions thereof to be mounted to a steering knuckle by a split king pin and having on lower portions thereof an axle locating portion, said axle locating portion for matingly receiving an end portion of said cross-beam, said right and left leading arms having at one end an axle locating portion for matingly receiving the end portion of said cross-beam, said cross-beam having an open cross-section and being rigid in bending but flexible in torsion, the open cross-section of said cross-beam having horizontal and vertical lines of symmetry, but asymmetric horizontal and vertical geometries, wherein the cross-beam is set in the axle locating portions of said right and left leading arms and said wheel mounting members with an interference fit, said right and left leading arms being adapted to be joined to the chassis frame of the vehicle, each of said leading arms also comprising a mounting base for attachment to an associated one of said spring and shock absorber systems, wherein said spring and shock absorber systems are adapted to be joined to the chassis frame of the vehicle, and wherein said Panhard rod are adapted to be joined at one end thereof to the chassis frame of the vehicle and at another end thereof to one of the right and left wheel mounting members, wherein each of said axle locating portions of said right and left wheel mounting members and said leading arms has an orifice in a negative shape of the open cross-section of said cross-beam.

13. A front suspension system according to claim 12, wherein said cross-beam has a section in a shape of an asymmetric cross potent.

14. A front-wheel axle unit with single tires comprising a front suspension system according to claim 12.

15. A front-wheel axle unit with single tires according to claim 14, wherein right and left wheels are driven by two short drive half-shafts with constant velocity joints and connected to right and left wheel hub and spindle assemblies.

16. A tandem of front axles comprising two front-wheel axle units with single tires according to claim 14.

* * * * *